Oct. 26, 1965  R. FLINTH  3,213,953
DEVICE FOR WEIGHING ROLLING STOCK
Filed April 21, 1964
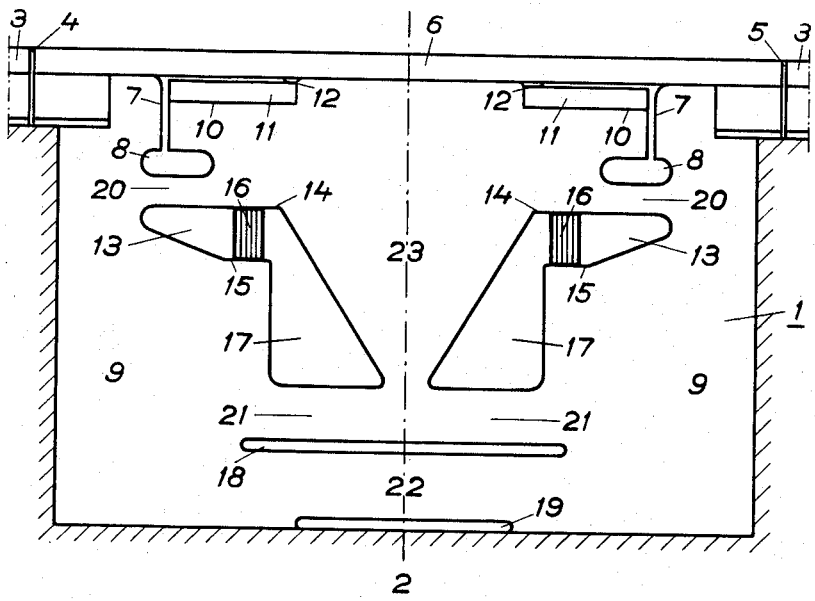
INVENTOR.
RUNE FLINTH
BY United States Patent Office 3,213,953
Patented Oct. 26, 1965

3,213,953
DEVICE FOR WEIGHING ROLLING STOCK
Rune Flinth, Vasteras, Sweden, assignor to Allmanna Svenska Elektriska Aktiebolaget, Vasteras, Sweden, a corporation of Sweden
Filed Apr. 21, 1964, Ser. No. 361,366
Claims priority, application Sweden, Apr. 23, 1963, 4,411/63
6 Claims. (Cl. 177—134)

The present invention relates to a device for weighing rolling stock such as railway wagons, vehicles, telphers, traverses and the like.

It is known to weigh rolling stock on rails with the help of a weighing machine, which consists of a weighing beam supported by pressure-sensing measuring means. The weighing beam supports a section of a rail, the upper side of which lies in plane with the rails lying on the sides of the weighing machine, but is separated therefrom by means of an open joint at each end, so that the rail section supported by the weighing machine can move freely in vertical direction. These joints must be so broad that the rail section can never come into contact with the rail on the sides at longitudinal expansions caused by the temperature. At weighing of heavy loads the rail section supported by the weighing machine will be pressed down and consequently a not inconsiderable level difference occurs on both sides of the join. The lever changing which occurs when a rolling load comes onto the weighing machine makes it necessary that the load is moved slowly, since otherwise the weighing machine begins to oscillate and the weighing is quite unreliable. Since an accurate weighing must take place slowly the weighing equipment is poorly utilized.

With a device according to the present invention it is possible with very great accuracy to weigh loads which roll over the weighing place with relatively high speed. The device comprises a container resting on a foundation, which consists of a load-sensing and a non-load-sensing part, the load-sensing part being supported by the non-load-sensing part by means of at least two pressure sensing means arranged at a distance from each other, which are inserted in openings between both parts of the container. The invention is characterised in that on the upper edge of the container a rail, weak in vertical direction, is fixed, which connects the centrally situated load-sensing part with the sections of the non-load-sensing part lying on both sides and which extends outside the container on both sides of this where it lies against the foundation, that the container at its upper edge is provided with two vertical slots, which extend downwards from said rail and separate the load-sensing part from said sections of the non-load-sensing part, and that from each of the vertical slots a very narrow horizontal space extends in towards the centre of the load-sensing part, whereby the parts of the rail lying above said spaces form membranes weak in vertical direction.

The weak membranes which are formed by the rail arrange above the container means that the transfer between the non-load-sensing and the load-sensing part is quite jointless but at the same time so sensitive in vertical direction that both the parts do not disadvantageously influence each other in the weighing direction. Since the space is very narrow, of the order of magnitude of 10–20μ, the vertical movement of the membrane is quite negligible and this means that the rail extremely rapidly comes into contact with the load-sensing part when a wheel rolls over the membrane part of the rail. This in combination with the jointless transfer between the non-load-sensing and the load-sensing part means that the rolling stock can have considerably higher speed than with known devices and the capacity of the measuring means is thereby of quite a different order of magnitude at the same time as the weighing is more exact.

On the accompanying drawing a sideview is shown of a suitable embodiment of the invention. The device consists substantially of a container 1 with a number of slots and recesses, whose functions will be explained later, and two pressure sensing means. The container is manufactured of strong iron plate and rests on a foundation 2, suitably of concrete. The container is inserted in a railway track, where the rail 3 is cut at 4 and 5 and replaced by the container. On the upper side of the container a rail 6 of the same dimension as the head of the rail 3, but made of iron with higher quality, is welded in order to obtain better properties in the device. At a distance from each of the ends of the container a vertical slot 7 is made which extends from the lower edge of the rail 6 downwards to a horizontal slot 8. The parts of the container, which are situated between the ends of the container and a vertical plane through the slots 7, support the load which is on the rail 6 above and both its parts 9 are called the non-load-sensing part of the container. From each of the slots 7 the container in its part immediately under the rail 6 is provided with a horizontal recess 10, which extends towards the middle of the container. In each of these recesses a distance piece 11 is laid. These distance pieces have such a thickness that between them and the rail 6 a very narrow space 12 occurs, so that the rail in unloaded condition does not lie against the distance pieces 11. The rail 6 is rather weak against pressure in vertical direction so that when a loaded wheel is on the part above the space 12, the rail is pressed down to lie against the distance piece 11.

Under each of the horizontal slots 8 a further horizontal slot 13 is made. The two horizontal surfaces 14 and 15 facing each other are carefully machined and constitute contact surfaces for two pressure sensing measuring means 16 inserted in said slots by prestressing. These means are suitably of the kind which consists of a core of magnetostrictive material which is provided with two windings, of which one is a magnetising winding which is fed with alternating current of suitable frequency, while the other is a measuring winding in which a voltage is induced, the amplitude of which is substantially proportional to the mechanical force which actuates the core.

The slot 13 with its end facing the centre of the container continues with an opening 17 extending towards the middle and downwards, which is here shown with substantially triangular section, but which also may have another appearance. At a distance below the openings 17 there is an extended narrow slot 18. The greater part of the part of the container situated below the slot 18 is separated from the base by a cut-out 19.

The material between the slots 8 and 13 forms membranes 20, resilient in vertical direction. In the same way two resilient membranes 21 are formed between the openings 17 and the slot 18, and a further membrane 22 between the slot 18 and the cut-out 19.

The central part of the container, which is limited in vertical direction by the rail 6 and the slot 18 and in horizontal direction by the slots 7, 8 and 13 and the openings 17, is called the load-sensing part 23 of the device. This part is supported substantially by the pressure-sensing measuring means 16, since both the rail 6 and the membranes 20 and 21 are relatively weak in the pressure direction, but rigid in horizontal direction, so that they reinforce the load-sensing part and take up lateral forces, which cannot therefore activate the pressure sensing means 16. The membrane 22 lying between the slot 18 and the cut-out 19 takes up possible stresses in the container so that these do not influence the load-sensing part and affect the measuring.

If a wheel of a loading wagon rolls from the left, passes the split 4 and rolls onto the rail 6 nothing happens as long as it is to the left of the slot 7. The load is then taken up by the non-load-sensing part 9 and is transmitted to the foundation 2. As soon as the wheel has passed the slot 7 the whole load is taken up by the load-sensing part 23. The pressure sensing caused by the load is taken up to the greatest extent by the left pressure sensing means 16, which gives a signal, which substantially corresponds to the total load. As long as the load is situated more or less straight above the left measuring means the force which activates the right measuring means is rather small. As the wheel moves to the right, an increasing part of the load is transmitted to the right measuring means with corresponding lessening on the left as a result. When the wheel is over the right measuring means the left one is quite unloaded. From this it is evident that the sum of the signals from both the measuring means is proportional to the load. By arranging both the measuring means at a certain distance from each other sufficient time for accurate weighing of the load which is passing is obtained. It is also quite clear that by increasing the distance between the measuring means the speed of the rolling stock may be increased and still there is sufficient time for measuring.

In order to avoid the possible uncertainty in the weighing, which may arise on account of natural oscillations or vibrations when the rail 6 is lying against the distance piece 11, the measuring may be carried out during only a part of the time interval during which both the measuring means are activated by the load. For example the measuring or registering means, which is supplied with signals from the measuring means 16, may be connected only when the difference between both the signals is less than a certain value.

The determining of the length of the actual weighing stretch, i.e., in principle the distance between both the vertical slots 7, may be done on various grounds, depending on the construction, in the first place the wheel distance of the wagons, whose load shall be measured. It may be possible to measure the load on each wheel individually for two or three-axled wagons. For bogie wagons it may be suitable to measure each bogie individually and finally weigh the whole wagon at once.

In determining the net load which is carried for example by an ore train, the empty train is driven over the weighing device and the load from all wheel axles is measured and added. After loading the train is again driven over the weighing device and the difference between both the registrations corresponds evidently to the net load.

In the figure has been shown only a device for the one rail in an arrangement for weighing of rail-bound vehicles. There is of course a similar device for the other rail. Both the devices are suitably combined to a unit, which may be pre-fabricated in the factory and erected on the weighing place in the foundation 2.

The shown embodiment should be seen only as an example to illustrate the invention idea. Modifications are of course possible regarding several of the details and principles for carrying out the weighing. It is also possible to use the device for weighing other than track-bound vehicles. Hanging load on telphere and traverses may be weighed with a device built into the telpher or traverse track.

I claim:

1. Device for weighing rolling stock on rails such as railway wagons, telphers, traverses and the like, comprising a container resting on a foundation, which consists of a load-sensing 23 and a non-load-sensing part 9, the load-sensing part 23 being supported by the non-load-sensing part by means of at least two pressure sensing means 16 arranged at a distance from each other, which are inserted in openings 17 between both parts 9, 23 of the container 1, on the upper edge of said container a rail 6, weak in vertical direction, being fixed, which connects the centrally situated load-sensing part 23 with the sections of the non-load-sensing part 9 lying on both sides and which extends outside the container on both sides of this where it lies against the foundation, the container at its upper edge being provided with two vertical slots 7, which extend downwards from said rail 6 and separate the load-sensing part 23 from said sections of the non-load-sensing part 9, and from each of the vertical slots 7 a very narrow horizontal space 12 extending in towards the centre of the load-sensing part, whereby the parts of the rail 6 lying above said spaces 12 form membranes weak in vertical direction.

2. Device according to claim 1, said narrow spaces 12 being formed by a distance piece 11 being laid in a horizontal recess 10 which extends from the vertical slot 7 in towards the centre of the load-sensing part 23; the upper side of the distance piece 11 as well as the facing part of the underside of the rail 6 being thereby machined with great accuracy.

3. Device according to claim 1, said load-sensing part 23 being supported by two pressure-sensing means 16, which are each arranged to give a signal proportional to the force by which they are actuated so that the sum of both the signals corresponds to the total load.

4. Device according to claim 3, at which the weighing takes place during a time interval, the length of which is determined by the spacing of the two pressure-sensing means and the speed of the rolling stock.

5. Device according to claim 1, the length of the load-sensing part 23 being adapted so that only one wheel at a time can activate it.

6. Device according to claim 1, the length of the load-sensing part 23 being adapted so that a whole bogie in a bogie wagon can activate it at one time.

References Cited by the Examiner

UNITED STATES PATENTS

| | | | |
|---|---|---|---|
| 1,865,446 | 7/32 | Sears | 117—163 |
| 2,339,152 | 1/44 | Connelly et al. | 117—134 |
| 2,796,503 | 6/57 | Ward | 73—141 |
| 3,130,383 | 4/64 | Hottinger | 73—141 |

FOREIGN PATENTS 147,349  2/61  Sweden.

OTHER REFERENCES

Germany, application No. 1,081,251, printed May 1960.

LEYLAND M. MARTIN, *Primary Examiner,*

LEO SMILOW, *Examiner,*